US009623846B2

United States Patent
Trager

(10) Patent No.: US 9,623,846 B2
(45) Date of Patent: Apr. 18, 2017

(54) VEHICLE SURFACE WASH APPARATUS WITH HEATED WASH FLUID

(71) Applicant: Toyota Motor Engineering & Manufacturing North America, Inc., Erlanger, KY (US)

(72) Inventor: Christian Arthur Trager, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/590,954

(22) Filed: Jan. 6, 2015

(65) Prior Publication Data
US 2016/0193986 A1    Jul. 7, 2016

(51) Int. Cl.
| | | |
|---|---|---|
| *B05B 1/28* | (2006.01) | |
| *B60S 1/48* | (2006.01) | |
| *F24J 3/00* | (2006.01) | |
| *B08B 3/12* | (2006.01) | |
| *B05B 9/00* | (2006.01) | |
| *B60S 1/50* | (2006.01) | |
| *B05B 15/00* | (2006.01) | |

(52) U.S. Cl.
CPC .............. *B60S 1/487* (2013.01); *B08B 3/12* (2013.01); *F24J 3/003* (2013.01); *B05B 9/002* (2013.01); *B05B 15/003* (2013.01); *B60S 1/50* (2013.01)

(58) Field of Classification Search
CPC ... B60S 1/487; B60S 1/50; B05B 9/002; F24J 3/003
USPC .......................................................... 239/103
See application file for complete search history.

(56) References Cited

U.S. PATENT DOCUMENTS

| | | | |
|---|---|---|---|
| 4,531,379 A | * | 7/1985 | Diefenthaler, Jr. .. B60H 1/3222 123/41.06 |
| 6,364,010 B1 | | 4/2002 | Richman et al. |
| 2002/0134857 A1 | | 9/2002 | Zimmer |
| 2005/0051111 A1 | * | 3/2005 | Thoma ..................... F24J 3/003 122/26 |
| 2010/0037415 A1 | * | 2/2010 | Lansinger .......... B60H 1/00271 15/250.01 |
| 2011/0126927 A1 | | 6/2011 | Pyun |
| 2012/0174333 A1 | * | 7/2012 | Heidacker ............... B60S 1/487 15/250.01 |

OTHER PUBLICATIONS

Three ES S.r.l., "La Technologia SPR HDI", Feb. 14, 2014, 47 pages.

* cited by examiner

*Primary Examiner* — Arthur O Hall
*Assistant Examiner* — Joel Zhou
(74) *Attorney, Agent, or Firm* — Christopher G. Darrow; Darrow Mustafa PC

(57) ABSTRACT

A vehicle surface wash apparatus using a cavitation heater fluidically coupled between a fluid reservoir and a spray nozzle to instantaneously heat wash fluid to an elevated temperature prior to dispensing the heated wash fluid through a spray nozzle onto a vehicle surface to be cleaned.

18 Claims, 3 Drawing Sheets

VEHICLE SURFACE WASH APPARATUS WITH HEATED WASH FLUID

TECHNICAL FIELD

The present disclosure relates to a vehicle surface or windshield wash system using a heated wash fluid.

BACKGROUND

Vehicle windshields, back lights and even headlights are provided with oscillating wipers to remove debris and water so that the windshield, backlight or headlight is maintained in a clear operative state. Such systems also include a wash fluid spray system, activated by a switch controlled by the vehicle driver, to apply a small amount of wash fluid onto the windshield, backlight or headlight so that the oscillation of the wipers across the windshield, etc., can more easily remove debris stuck on the windshield.

The wash fluid is typically contained in a reservoir located in the engine compartment. The vehicle driver actuated switch activates a pump for pumping fluid from the reservoir to a spray nozzle. The duration of wash fluid spray can be for as long the vehicle driver maintains the switch in an actuated position or, more frequently, for set time duration of, for example, five seconds.

The wash fluid in the fluid reservoir is at ambient temperature which can range from −20° F. to over 100° F. The water is strictly employed as the sole or main constituent of the wash fluid. Other additives, such as antifreeze, cleaning agents, etc., are commonly employed as part of the wash fluid.

It is known that cleaning fluids operate more effectively when heated. Previous attempts have been made to provide heated windshield, backlight and headlight wash systems.

Current systems employ heating the fluid within its storage container. These systems are inefficient and waste energy by always keeping the wash fluid at an elevated temperature. Thus, there exists a need to selectively heat wash fluid prior to it being disbursed onto a surface.

SUMMARY

A vehicle surface cleaning apparatus including at least one spray nozzle positioned to dispense wash fluid onto a vehicle surface to be cleaned, a fluid reservoir containing wash fluid, and a fluid heater including a housing coupled in fluid-flow communication to the fluid reservoir and to the at least one spray nozzle. A rotor is mounted within the housing. The rotor contains a plurality of exterior cavities wherein cavitation is induced in the wash fluid by rotation of the rotor to substantially instantaneously heat the wash fluid to a higher temperature for application through the at least one spray nozzle onto a vehicle surface.

The apparatus includes an electric motor coupled to the rotor for rotating the rotor when an actuator switch supplies electric power to the motor.

The motor may also be coupled to a pump for providing wash fluid into the housing.

In one aspect, the plurality of cavities on the rotor has an open end facing outward from an outer surface of the rotor. The open ends of the plurality of cavities are spaced by a thin clearance space from an adjacent outer wall of the housing.

In one aspect, the plurality of cavities has a closed interior end.

In one aspect, the plurality of cavities covers substantially the entire outer surface of the rotor.

BRIEF DESCRIPTION OF THE DRAWING

Various features, advantages, and other uses of the present vehicle surface wash apparatus will become more apparent to those skilled in the art by reference to the following description and the accompanying drawings wherein like reference numerals refer to like parts throughout the several views, and wherein.

DETAILED DESCRIPTION

The present disclosure describes an apparatus used to substantially instantaneously heat wash fluid dispensed onto a surface to be cleaned. The wash fluid is heated for more effective cleaning.

Figure 1:
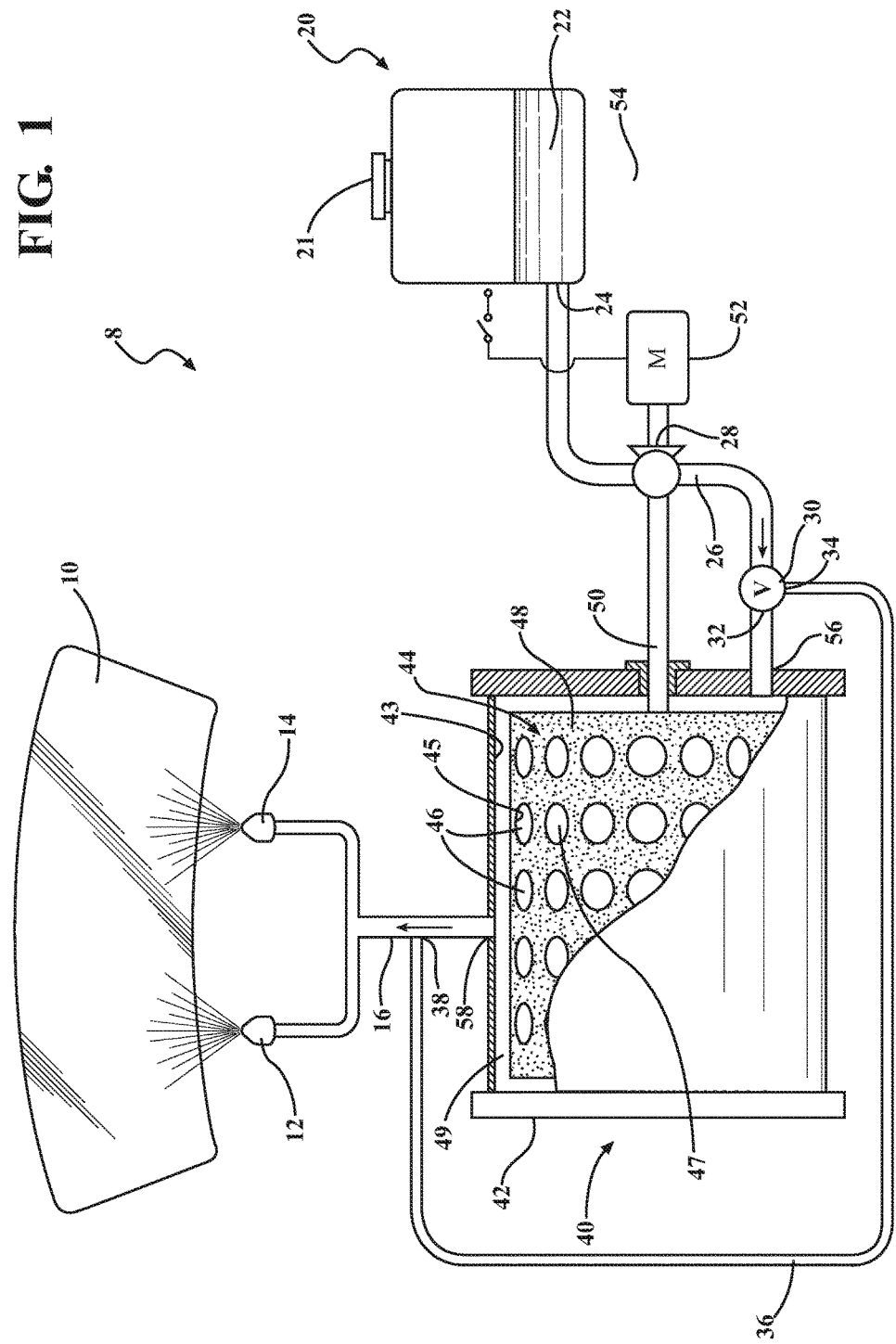
FIG. 1 is a general schematic view of a vehicle surface wash apparatus according to the present disclosure.

Referring to FIG. 1, a vehicle windshield wash apparatus 8 substantially instantaneously heats wash fluid to a higher than ambient temperature for more effective application to a vehicle surface, such as a windshield, backlight, or headlamp cover. The heater portion of the vehicle wash apparatus 8 heats the wash fluid to an elevated temperature so that the vehicle driver applies the wash fluid to the vehicle surface substantially instantaneously upon activation of the wash system.

A vehicle includes a surface to be cleaned, such as a windshield 10. Hereafter, the term "windshield" will be understood to cover any surface on the vehicle which is to be cleaned by the application a wash fluid regardless of whether the wash fluid is cleaned from the surface by oscillating wipers. Thus, for example, the surface on the vehicle to be cleaned may be but not limited to the windshield 10, a backlight, vehicle headlamp covers, windows, etc.

Two spray nozzles 12 and 14 are fluidically coupled to a fluid reservoir 20 containing a wash fluid 22. It should be appreciated by those skilled in the art that at least one or a plurality of spray nozzles may be fluidically connected to the fluid reservoir 20.

The fluid reservoir 20 includes a removable cap 21 allowing the quantity of wash fluid 22 contained within the fluid reservoir 20 to be replenished.

The wash fluid 22 may be any wash fluid suitable for use on a vehicle exterior surface. The wash fluid 22 may be formed entirely of water, or water with one or more additives, such as antifreeze, surfactants, sheeting agents, cleaning agents, etc.

The vehicle surface wash apparatus may further include a pump 28. The pump 28 may provide wash fluid 22 from the reservoir 20 to nozzles 12 and 14. The pump 28 may be located anywhere throughout the vehicle surface wash apparatus 8, including but not limited to along a conduit 26 connecting the reservoir 20 to a heater 40, integrated within the heater 40, or along a conduit 16 connecting the heater to the spray nozzles 12 and 14. Where pump 28 is integrated within the heater 40, it should be noted that pump 28 may be positioned at the inlet 56, or the outlet 58 of the heater 40 (not shown).

In some seasons, the wash fluid 22 is already heated by ambient conditions and therefore does not need to undergo cavitation. Bypassing the heater 40 through valve 30 may increase the efficiency of the vehicle surface wash apparatus 8. Therefore, in some embodiments, the vehicle surface wash apparatus 8 may also include a valve 30. The valve 30 may be a diverter valve. Valve 30 may selectively provide wash fluid 22 from the fluid reservoir 20 to a heater 40 through a first outlet 32. Alternatively, valve 30 may bypass the heater 40 by providing wash fluid 22 through a second outlet 34 to conduit 36 and, from conduit 36 to the spray nozzles 12 and 14 through opening 38. There may be an additional valve (not shown) positioned along conduit 36. The additional valve may seal off flow in conduit 36 when valve 30 passes fluid from the fluid reservoir 20 to the heater 40.

The valve 30 may be adjusted by a central processing unit, or CPU (not shown). The CPU may receive data from a temperature sensor (not shown). The temperature sensor may determine a temperature of any of the wash fluid 22, an ambient temperature, and an engine compartment temperature. The CPU may selectively provide, via valve 30, wash fluid 22 to either the heater 40 or directly to the spray nozzles 12 and 14 based on data recorded from the temperature sensor.

Where valve 30 is included, it should be noted that the valve 30 should be positioned within the apparatus in front of pump 28 (as shown in FIG. 1). Valve 30 may receive wash fluid 22 from pump 28. Furthermore, valve 30 should be positioned to provide wash fluid 22 to the heater 40.

The vehicle surface wash apparatus 8 includes the heater 40, in the form of a cavitation heater, to substantially instantaneously heat the wash fluid 22 to a predetermined effective, elevated cleaning temperature.

The heater 40 includes an outer housing 42 surrounding a rotor 44. The rotor 44 is in the form of a cylinder coupled to a drive shaft 50. The drive shaft 50 is mounted through suitable bearings and seals, not shown, in the sidewall of the housing 42 where it is coupled between the rotor 44 and a motor 52. The motor 52 may be an electric motor. The motor 52 outputs rotational torque onto the drive shaft 50, which in turn rotates the rotor 44. The motor 52 in some embodiments may be configured to drive pump 28 as well as the drive shaft 50. Pump 28 may be mechanically aligned and mounted to drive shaft 50, in which case pump 28 would be driven at substantially the same rotational speed as rotor 44.

Alternately, instead of a single drive shaft 50 extending from an output of the motor 50 to the rotor 44, the rotor 44 may be mounted on an axle rotatably supported in the housing 40 and having an outer end coupled through bearings and seals in one wall of the housing 42. The outlet end of the axle can be provided with a suitable coupling, such as splines, etc., for coupling to the drive shaft 50 from the motor 52.

An outer surface 48 of the rotor 44 is spaced in close proximity to an inner surface 43 of an outer wall of the housing 42. A plurality of indentations or cavities 46 are formed in the outer surface 48 of the rotor 44. The cavities 46 have an open end 45 at the exterior surface of the rotor 44 and a closed inner end 47, and may take any one or a combination of different shapes designed to cause cavitation of the wash fluid 22 contained within the housing 42 during high-speed rotation of the rotor 44. The cavities 46 may be but not limited to semi-circular depressions, circular diameter bores extending from the outer surface 44 into an interior of the rotor 44, as well as other curved or irregular shaped depressions in the outer surface 48 of the rotor 44.

The cavities 46 can be arranged in any configuration on the outer surface 44, with the aligned rows and circumferentially spaced cavities 44 being shown as an example.

In operation, a portion of the wash fluid 22 in the fluid reservoir 20 is transferred through the conduit 26 coupled to an outlet 24 of the fluid reservoir 20, through an inlet 56 in the heater housing 42, and fills the small clearance space 49 between the outer surface 48 of the rotor 44 and the inner surface 43 of the housing 42. Activation by the vehicle driver of a switch 54, typically contained on the vehicle steering column or dashboard, supplies electric power to the motor 52 which, through the drive shaft 50, rotates the rotor 44 at a high speed in the housing 42. Due to the small clearance space 49 between the outer surface 48 of the rotor 44 and the adjacent inner surface 43 of the housing 42, the wash fluid 22 is squeezed and expands to form bubbles 51 (of FIG. 2) as it moves over each cavity 46 during rotation of the rotor 44. The pressure within the housing 52 explosively collapses the bubbles 51, creating heat energy which is transferred to the wash fluid 22, thereby heating the wash fluid 22 to an elevated cleaning temperature. The elevated cleaning temperature may range between 100° F. and 180° F., for example. The wash fluid 22, subsequent to being heated in the heater 40, exits an outlet 58 of the housing 52 and flows through the conduit 16 to the spray nozzle or nozzles 12 and 14 for application onto the windshield 10.

Figure 2:
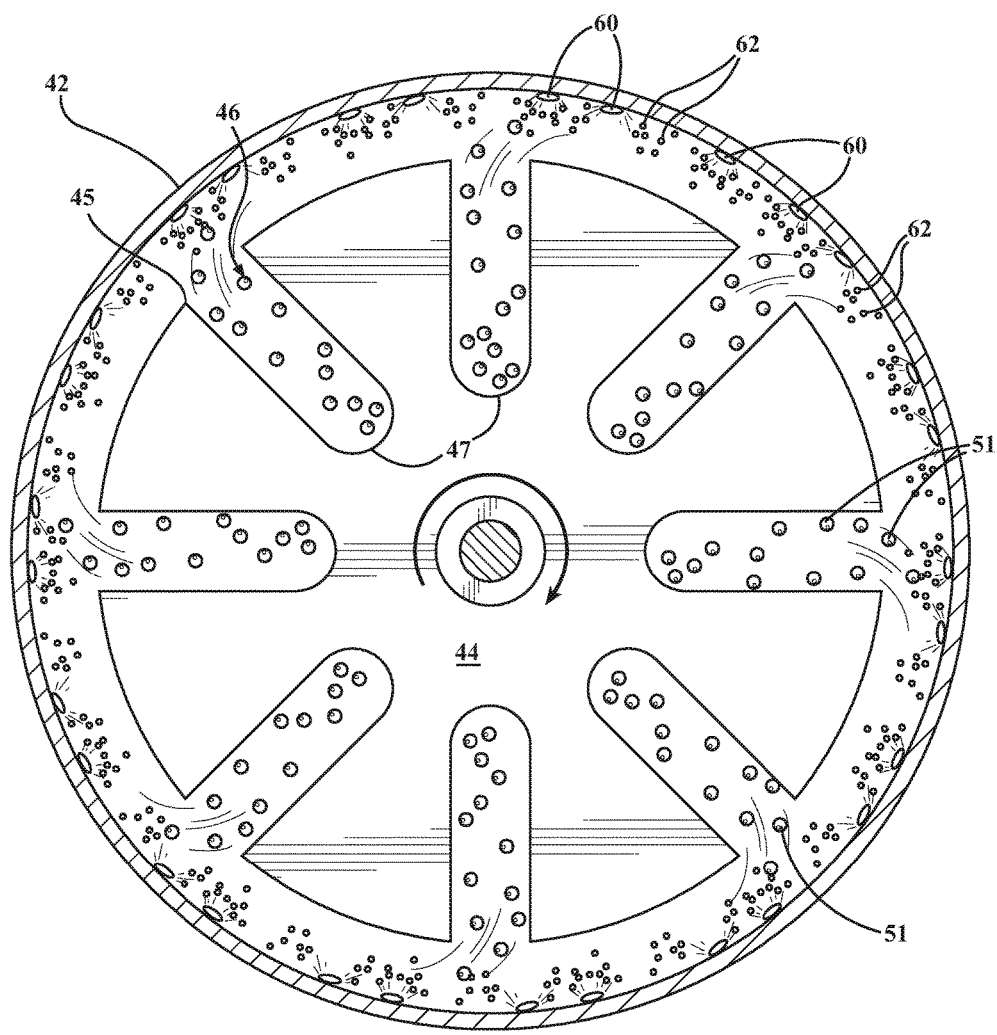
FIG. 2 is a detailed cross-sectional view of a heater of the vehicle surface wash apparatus of FIG. 1 according to the present disclosure.
Figure 3:
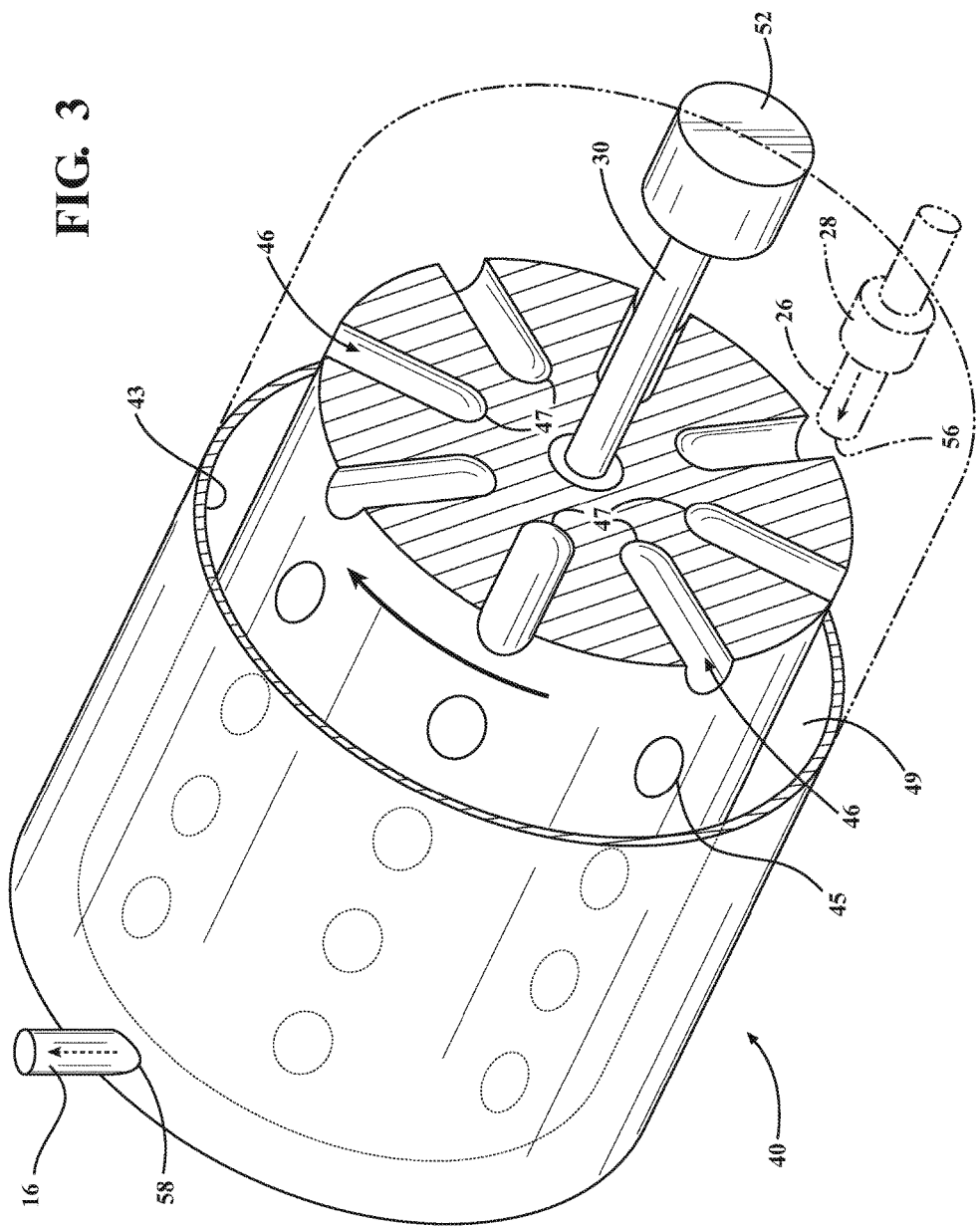
FIG. 3 is a perspective view of the heater of FIG. 2 according to the present disclosure.

Referring now to FIGS. 2 and 3, the rotor 44 is shown in greater detail through a cross-sectional view and perspective view, respectively.

When switch 54 is activated, the motor 52 outputs a rotational load on the drive shaft 50. The drive shaft 50 rotates the rotor 44 displaced within the housing 42. Wash fluid 22 is drawn from the reservoir 20 into the housing 42 from pump 28. As stated above, pump 28 may be mechanically mounted to drive shaft 50 and driven at substantially the same rotational speed as rotor 44, or pump 28 may be driven by a separate motor (not shown).

When the wash fluid 22 enters the housing 42, it begins to interact with the rotor 44. As the rotor 44 rotates, bubbles 51 are formed in the cavities 46. As the rotor 44 rotates, the bubbles 51 are discharged from the cavities 46 and strike the inner surface 43 of the housing 42. The bubbles 51 are then compressed against the inner surface 43 of the housing 42, forming a compressed bubble 60. The more kinetic energy the bubbles 51 have as they exit the cavities 46, the more the bubbles are compressed against the inner surface 43 of the housing 42. When the compressed bubble 60 has enough kinetic energy, it splits and forms a group of smaller bubbles 62. As a result of the splitting of bubbles 51, the kinetic energy of the bubbles 51 is transferred into heat energy, causing a small pocket of heat in the area surrounding the collision of the bubble 51 into the inner surface 43 of the housing 42. The small pocket of heat dissipates into its surrounding area, which would be the wash fluid 22 around the collision. This process, known in the art as cavitation, continues so long as the rotor 44 continues spinning and causes bubbles 51 to strike the inner surface 43 of the housing 42.

As the wash fluid 22 flows from the inlet 56, through the housing 42, and out the outlet 58, the wash fluid is heated throughout this cavitation process.

Thus, there has been disclosed a vehicle surface cleaning apparatus which instantaneously heats a wash fluid to an elevated temperature, when the wash system is actuated, to supply the heated wash fluid onto a selected vehicle surface, such as a windshield, backlight or headlamp cover. The wash system uses a cavitation heater which also serves as a pump to draw new quantities of wash fluid from a fluid reservoir into the heater housing and then onto the vehicle surface.

The foregoing description relates to what is presently considered to be the most practical embodiments. It is to be understood, however, that the disclosure is not to be limited to these embodiments but, on the contrary, is intended to cover various modifications and equivalent arrangements included within the spirit and scope of the claims, which scope is to be accorded the broadest interpretation so as to encompass all such modifications and equivalent structures as is permitted under the law.

What is claimed is:

1. A vehicle surface cleaning apparatus comprising:
   at least one spray nozzle positioned to dispense wash fluid onto a vehicle surface to be cleaned;
   a fluid reservoir for the wash fluid;
   a fluid heater including:
      a housing coupled in fluid flow communication to the fluid reservoir and to the at least one spray nozzle; and
      a rotor rotatably mounted within the housing, the rotor defining a plurality of cavities carried on an outer surface of the rotor to induce cavitation in the wash fluid in the housing during rotation of the rotor to heat the wash fluid to an elevated temperature for application through the at least one spray nozzle onto a vehicle surface;
   a drive shaft;
   a pump mounted to the drive shaft, the pump providing wash fluid from the fluid reservoir to the at least one spray nozzle; and
   a motor mechanically aligned with the pump, the drive shaft extending from the motor to the rotor, and the motor operable to rotate the drive shaft and drive both the pump and the rotor.

2. The apparatus of claim 1 further comprising:
   a switch actuatable to supply power to the motor.

3. The apparatus of claim 1 wherein:
   each of the plurality of cavities defines an open end at an exterior surface of the rotor.

4. The apparatus of claim 3 wherein:
   the open end of each of the plurality of cavities is in close proximity to an interior wall of the housing.

5. The apparatus of claim 3 wherein:
   each of the plurality of cavities has a closed interior end spaced from the open end.

6. The apparatus of claim 1 wherein:
   the plurality of cavities extend over substantially the entire outer surface of the rotor.

7. The apparatus of claim 1 wherein:
   the pump is integrated within the housing of the fluid heater adjacent the rotor.

8. The apparatus of claim 1 wherein:
   the pump is provided along a first conduit passing wash fluid from the fluid reservoir to the housing and wherein the apparatus further comprises a diverter valve for selectively communicating wash fluid from a first outlet to the housing of the fluid heater, or from a second outlet to a second conduit adjacent the housing to the spray nozzles.

9. The apparatus of claim 3 wherein:
   the open end of each of the plurality of cavities is in close proximity to an inner wall of the housing.

10. The apparatus of claim 3 wherein:
    each of the plurality of cavities has a closed interior end spaced from the open end.

11. The apparatus of claim 3 wherein:
    the plurality of cavities extend over substantially the entire outer surface of the rotor.

12. The apparatus of claim 1 further comprising:
    a switch actuatable to supply power to the motor,
    wherein each of the plurality of cavities has: an open end at an exterior surface of the rotor in close proximity to an inner wall of the housing; and a closed interior end spaced from the open end.

13. The apparatus of claim 12 wherein:
    the plurality of cavities extend over substantially the entire outer surface of the rotor.

14. The apparatus of claim 1 further comprising a diverter valve, wherein:
    the diverter valve selectively provides wash fluid from the fluid reservoir to either the fluid heater or directly to the spray nozzles.

15. The apparatus of claim 14 wherein:
    the diverter valve receives wash fluid from the pump.

16. The apparatus of claim 1 wherein:
    the motor drives the rotor at a first rotational speed and the motor drives the pump at a second rotational speed, wherein the first and second rotational speed are the same rotational speed.

17. A vehicle surface cleaning apparatus comprising:
    at least one spray nozzle positioned to dispense wash fluid onto a vehicle surface to be cleaned;
    a fluid reservoir for the wash fluid;
    a fluid heater including:
       a housing coupled in fluid flow communication to the fluid reservoir and to the at least one spray nozzle; and
       a rotor rotatably mounted within the housing, the rotor defining a plurality of cavities carried on an outer surface of the rotor to induce cavitation in the wash fluid in the housing during rotation of the rotor to heat the wash fluid to an elevated temperature for application through the at least one spray nozzle onto a vehicle surface;
    a drive shaft;
    a pump mounted to the drive shaft, the pump providing wash fluid from the fluid reservoir to the at least one spray nozzle; and
    a motor, wherein the drive shaft extends from the motor and is operable to drive the pump at a first rotational speed and the rotor at a second rotational speed, the first rotational speed and the second rotational speed being the same.

18. The apparatus of claim 17, wherein the drive shaft is mechanically aligned with the rotor, and further wherein the pump is mechanically aligned with the motor.

* * * * *